(12) United States Patent
Seto et al.

(10) Patent No.: US 9,662,799 B2
(45) Date of Patent: May 30, 2017

(54) BAND SAW

(71) Applicants: AMADA COMPANY, LIMITED, Kanagawa (JP); AMADA MACHINE TOOLS CO., LTD., Kanagawa (JP)

(72) Inventors: Akio Seto, Kanagawa (JP); Susumu Tadano, Kanagawa (JP)

(73) Assignees: AMADA COMPANY, LIMITED, Kanagawa (JP); AMADA MACHINE TOOLS CO., LTD., Kanagawa (JP)

( * ) Notice: Subject to any disclaimer, the term of this patent is extended or adjusted under 35 U.S.C. 154(b) by 254 days.

(21) Appl. No.: 14/391,102

(22) PCT Filed: Apr. 18, 2013

(86) PCT No.: PCT/JP2013/061441
§ 371 (c)(1),
(2) Date: Oct. 7, 2014

(87) PCT Pub. No.: WO2013/164950
PCT Pub. Date: Nov. 7, 2013

(65) Prior Publication Data
US 2015/0114201 A1 Apr. 30, 2015

(30) Foreign Application Priority Data
May 2, 2012 (JP) ................................. 2012-105117

(51) Int. Cl.
*B26D 7/08* (2006.01)
*B23D 55/08* (2006.01)
*B26D 1/54* (2006.01)

(52) U.S. Cl.
CPC ............ *B26D 7/086* (2013.01); *B23D 55/08* (2013.01); *B23D 55/082* (2013.01); *B26D 1/54* (2013.01); *Y10T 83/7264* (2015.04)

(58) Field of Classification Search
CPC ...... B23D 55/00; B23D 55/08; B23D 55/082; B26D 7/086
(Continued)

(56) References Cited

U.S. PATENT DOCUMENTS 4,127,045 A * 11/1978 Blucher ............... B23D 55/088
83/796
4,289,053 A * 9/1981 Sawamura ........... B23D 55/084
83/522.14
(Continued)

FOREIGN PATENT DOCUMENTS

DE 3906321 6/1990
JP 4-13220 2/1992
(Continued)

OTHER PUBLICATIONS

Search report from International Patent Appl. No. PCT/JP2013/061441, mail date is Jul. 16, 2013.

*Primary Examiner* — Jason Daniel Prone
*Assistant Examiner* — Richard Crosby, Jr.
(74) *Attorney, Agent, or Firm* — Greenblum & Bernstein, P.L.C.

(57) ABSTRACT

A band saw is includes a driving wheel and a driven wheel rotatably provided at a saw housing; an endless saw band made to run around the driving wheel and the driven wheel; and a plurality of saw band guiding devices for directing and guiding cutting edges of the saw band toward a direction of a workpiece to be cut. The saw band guiding devices are constructed to be movable in directions where one of the guiding devices gets closer to and away from another of the guiding devices, wherein each of the saw band guiding devices includes vibrating means for vibrating the saw band in a cutting direction relative to the workpiece. A pressure member holder including a plurality of pressure rollers or a (Continued)

pressure member for pressing a back surface of the saw band is provided in each of the saw band guiding devices.

3 Claims, 6 Drawing Sheets

(58) Field of Classification Search
USPC .................................................. 83/788–820
See application file for complete search history.

(56) References Cited

U.S. PATENT DOCUMENTS

| | | | | |
|---|---|---|---|---|
| 4,290,330 | A * | 9/1981 | Washio | B23D 55/082 83/171 |
| 4,558,614 | A * | 12/1985 | Harris | B23D 53/08 83/56 |
| 4,766,790 | A * | 8/1988 | Harris | B23D 53/08 83/56 |
| 4,852,430 | A * | 8/1989 | Oppliger | B23D 63/18 72/179 |
| 4,901,612 | A * | 2/1990 | Harris | B23D 53/08 83/56 |
| 5,410,934 | A * | 5/1995 | Krippelz | B23D 55/082 83/820 |
| 5,931,057 | A * | 8/1999 | Beck | B23D 63/18 76/25.1 |
| 6,202,528 | B1 * | 3/2001 | Morgan | B23D 55/082 83/820 |
| 7,654,184 | B2 | 2/2010 | Aihara et al. | |
| 7,930,963 | B2 * | 4/2011 | Tokiwa | B23D 55/082 83/661 |
| 8,051,756 | B2 | 11/2011 | Hashimoto et al. | |
| 8,240,236 | B2 * | 8/2012 | Benz | B23D 47/005 83/169 |
| 8,261,647 | B2 * | 9/2012 | Dale | B23D 55/082 83/764 |
| 8,365,643 | B2 | 2/2013 | Aihara et al. | |
| 9,085,036 | B2 * | 7/2015 | Chiao | B23D 59/04 |
| 2006/0144202 | A1 * | 7/2006 | Tokiwa | B23D 55/005 83/74 |
| 2008/0202306 | A1 | 8/2008 | Tokiwa et al. | |
| 2008/0276775 | A1 * | 11/2008 | Hewitt | B23D 53/045 83/56 |

FOREIGN PATENT DOCUMENTS

| | | |
|---|---|---|
| JP | 2006-62073 | 3/2006 |
| JP | 2007-144622 | 6/2007 |
| JP | 2007-181924 | 7/2007 |

* cited by examiner

BAND SAW

TECHNICAL FIELD

The present invention relates to a band saw in which an endless saw band is made to run around a driving wheel and a driven wheel and a vibrator means for vibrating the saw band in a cutting direction relative to a workpiece is given to a saw band guiding device for directing and guiding cutting edges of the saw band toward the workpiece, and in particular relates to a band saw in which a pressure member for pressing a back surface of the saw band is made to have a longer operation life, safety is improved, and the total constitution is made to be compact.

BACKGROUND ART

There have been to date arts in which saw bands are vibrated so as to have all teeth of the saw bands to cut in workpieces in order to suppress noise by chatter vibrations at a time of cutting the workpieces. (See the Patent Literatures 1 and 2)

CITATION LIST

Patent Literature

[PTL 1]: Japanese Patent Application Laid-open No. 2006-062073

[PTL 2]: Japanese Patent Application Laid-open No. 2007-144622

SUMMARY OF INVENTION

Any band saw disclosed in the Patent Literatures 1 and 2 is a horizontal band saw, the whole construction of which is like one shown in FIG. 1. More specifically, the band saw 1 is comprised of a base frame 3 which is comprised of a vise device 5 fixable of a workpiece W to be cut. Further on the base frame 3 provided is a saw housing 11 rotatably having a driving wheel 7 and a driven wheel 9 in a way as to be vertically movable by means of operation of a vertical operation device 13 such as a hydraulic cylinder for example.

An endless saw band 15 is made to run around the driving wheel 7 and the driven wheel 9. Further on a guide beam 17 provided in the saw housing 11 provided are guide arms 21A,21B, on tip end portions (lowermost end portions) of which provided are saw band guiding devices 19A,19B for directing and guiding cutting edges of the saw band 15 in a cutting direction relative to the workpiece W. One guide arm 21A of the guide arms 21A,21B is secured to the guide beam 17 and another guide arm 21B is provided in a way as to regulate the position according to the dimensions of the workpiece W.

Further a vibrating means 23 for vibrating the saw band 15 in the cutting direction has a construction shown in FIGS. 2A, 2B. More specifically, on a bracket 25 attached to the upper portion of the guide arm 21A provided is a gear box 27 on which a rotary shaft 29 is provided. The rotary shaft 29 is one rotated by a motor 31 attached to the gear box 27. On one end side of the rotary shaft 29 provided is a cam 33 of a proper shape and on another end side thereof provided is a spline shaft 35 parallel with the guide beam 17. And the aforementioned spline shaft 35 establishes spline fit on a spline sleeve 37 provided rotatably on an upper portion of the guide arm 21B. To the spline sleeve 37 provided is a cam 33A similar to the cam 33.

Further, at the upper portions of the guide arms 21A,21B provided are brackets 39 (see FIG. 2B), each of which is comprised of a rocking arm 43 capable of rocking up and down via a pivot 41. Further, an upper end portion of a pressure rod 47 vertically movably provided on the guide arms 21A,21B gets contact with the lower surface at the tip end side of the rocking arm 43. The lower end portion of the pressure rod 47 gets contact with a backup retainer member 49 provided on each saw band guiding device 19A,19B.

Therefore, both the saw band guiding devices 19A,19B are those synchronously vibrated in the cutting directions relative to the workpiece W by rotation of the motor 31.

By the way, the saw housing 11 of the band saw 1 as described above is slanted fore and aft so that the upper portion side is made to be the rear side (the back surface side in FIG. 1) and the guide beam 17 is one comprised to project forward from the upper portion side of the saw housing 11 so that the saw band 15 is disposed above a region where the saw band 15 cuts the workpiece W. A space above the guide beam 17 therefore has a sufficient space to enable a construction in which the spline shaft 35 and such are disposed above the guide beam 17 as shown in FIG. 2A. More specifically, in the band saw 1 with a construction in which rotary shafts of the driving wheel 7 and the driven wheel 9 are slanted, it is possible that the spline shaft 35 and such are disposed above the guide beam 17 so that both the saw band guiding devices 19A,19B synchronously work.

However, a band saw in which rotary shafts of a driving wheel and a driven wheel are substantially horizontal, more specifically a plane on which the driving wheel and the driven wheel rotate is substantially vertical, has a whole construction as schematically shown in FIG. 3. More specifically, the band saw 1A of this type is comprised of a vise device 5A on a base frame 3A. Further a saw housing 11A is provided in such a way as to be vertically movable along a guide post 57 provided to stand on the base frame 3A and as well a vertical operation device 13A for moving the saw housing 11A vertically is provided.

The saw housing 11A is comprised of a beam member 59 elongated in a parting direction between the driving wheel 7 and the driven wheel 9 (the lateral direction in FIG. 3), one end side of the beam member 59 is comprised of a driving wheel housing 61A housing the driving wheel 7 and another end side of the beam member 59 is comprised of a driven wheel housing 61B housing the driven wheel 9. In the meantime, to the driving and driven wheel housings 61A, 61B provided is a front cover in an openable-closable way. Further one saw band guiding device 19A is provided to the guide arm 21A in a unitary body with the driving wheel housing 61A and another saw band guiding device 19B is provided to the movable guide arm 21B provided on the beam member 59 in a way as to regulate the position.

In the band saw 1A constituted in a way described above, the driving and driven wheel housings 61A,61B are provided to be substantially vertical below the beam member 59 and the saw band guiding devices 19A,19B are provided in between the driving and driven wheels 61A,61B and below the beam member 59. Therefore the vibrating means 23 of a construction shown in FIG. 2A is provided at the upper portion of the beam member 59 and it is difficult to construct both the saw band guiding devices 19A,19B to work synchronously.

Thus, as shown in FIG. 2 of the Patent Literatures 1, 2, it is inherently necessary to provide it with motors as correspondent with the respective saw band guiding devices 19A,19B. In this case, the construction shown in FIG. 2 of the Patent Literatures 1, 2, is a construction where vibration is given to the saw band in the cutting direction by rotating a rotating body in a state where the rotating body having serration portions on the outer periphery surface is in direct contact with a back surface of the saw band. The serration portions of the rotating body reciprocally get contact with the back surface of the saw band and it gives rise to a problem of generating noise. Further, in the aforementioned construction, it further gives rise to a problem that it is difficult to extend the lifetime of the rotating body as the serration portions of the rotating body directly press the back surface of the saw band.

According to an aspect of the present invention, a band saw is comprised of: a driving wheel and a driven wheel rotatably provided at a saw housing; an endless saw band made to run around the driving wheel and the driven wheel; and a plurality of saw band guiding devices for directing and guiding cutting edges of the saw band toward a direction of a workpiece to be cut, wherein the saw band guiding devices are constructed to be movable in directions where one of the guiding devices gets closer to and away from another of the guiding devices, wherein each of the saw band guiding devices comprises vibrating means for vibrating the saw band in a cutting direction relative to the workpiece, wherein a pressure member holder comprising a plurality of pressure rollers or a pressure member for pressing a back surface of the saw band is provided in each of the saw band guiding devices, and wherein the pressure member holders are provided to be rockably pivoted substantially on a central portion of a rocking arm provided to be capable of rocking in directions getting closer to and away from the back surface of the saw band at each of the saw band guiding devices.

Advantageous Effects of Invention

As it is constructed to press the back surface of the saw band by the plurality of pressure rollers or the plurality of pressure members provided in the pressure member holder pivoted substantially on the central portion of the rocking arm being capable of rocking in directions where they get closer to and away from the back surface of the saw band according to the present invention, in the construction that the back surface of the saw band is pressed by the plurality of pressure rollers, the plurality of rollers is steadily in a state of having contact with the back surface of the saw band and the load on the workpiece in the cutting direction is dispersed to the respective pressure rollers, thereby extending the lifetime of the pressure rollers.

Moreover, in the construction that the back surface of the saw band is pressed by the pressure members, the pressure members can be kept steadily in a plane contact with the back surface of the saw band, and the load on the workpiece in the cutting direction is dispersed to the whole of the contact surface, thereby extending the lifetime of the pressure members.

DESCRIPTION OF EMBODIMENTS

Exemplary embodiments of the present invention will be described hereinafter with reference to the appended drawings.

Figure 4:
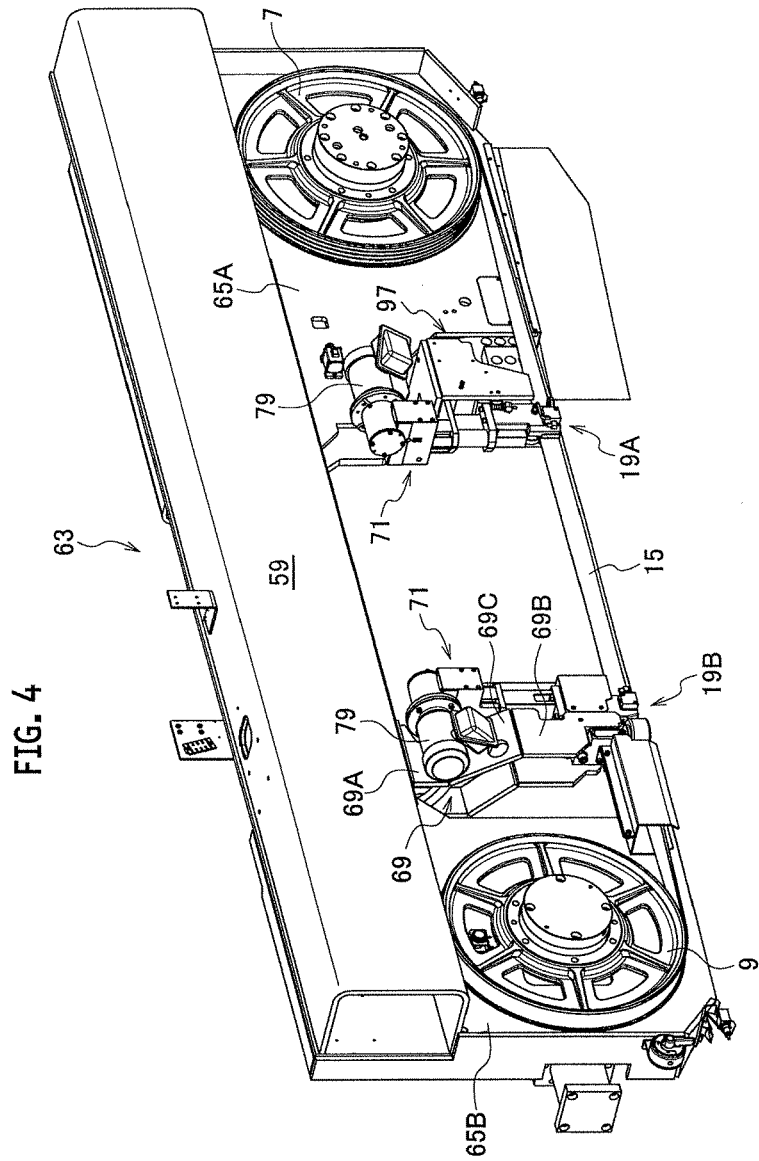
FIG. 4 is a perspective view of a horizontal band saw according to an embodiment of the present invention, which mainly shows its wheels, its saw band and its guiding device.

In the description of the embodiments of the present invention with reference to FIG. 4 and subsequent drawings, while a horizontal band saw is exemplified, it could be embodied as a vertical band saw. By the way, to elements serving the same functions as elements in the band saw described above, the same reference signs will be attached, and then redundant descriptions will be omitted.

Figure 1:
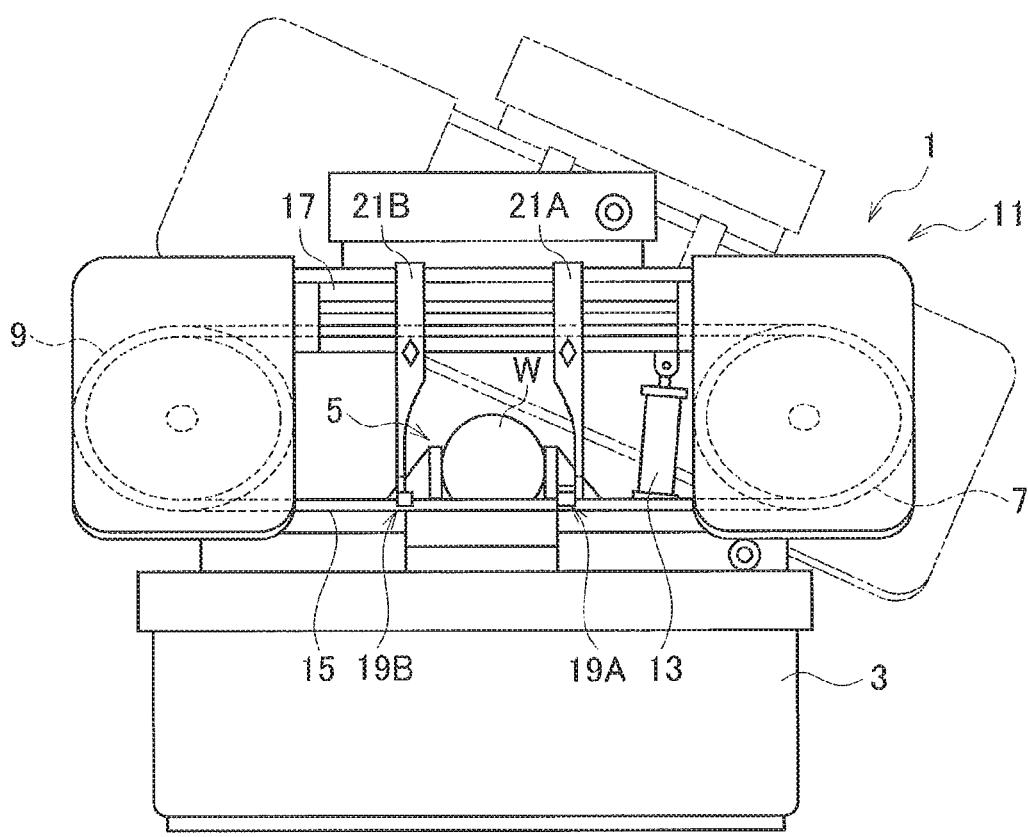
FIG. 1 is a schematic elevational view of a horizontal band saw according to an example involved in the prior art.
Figure 2A:
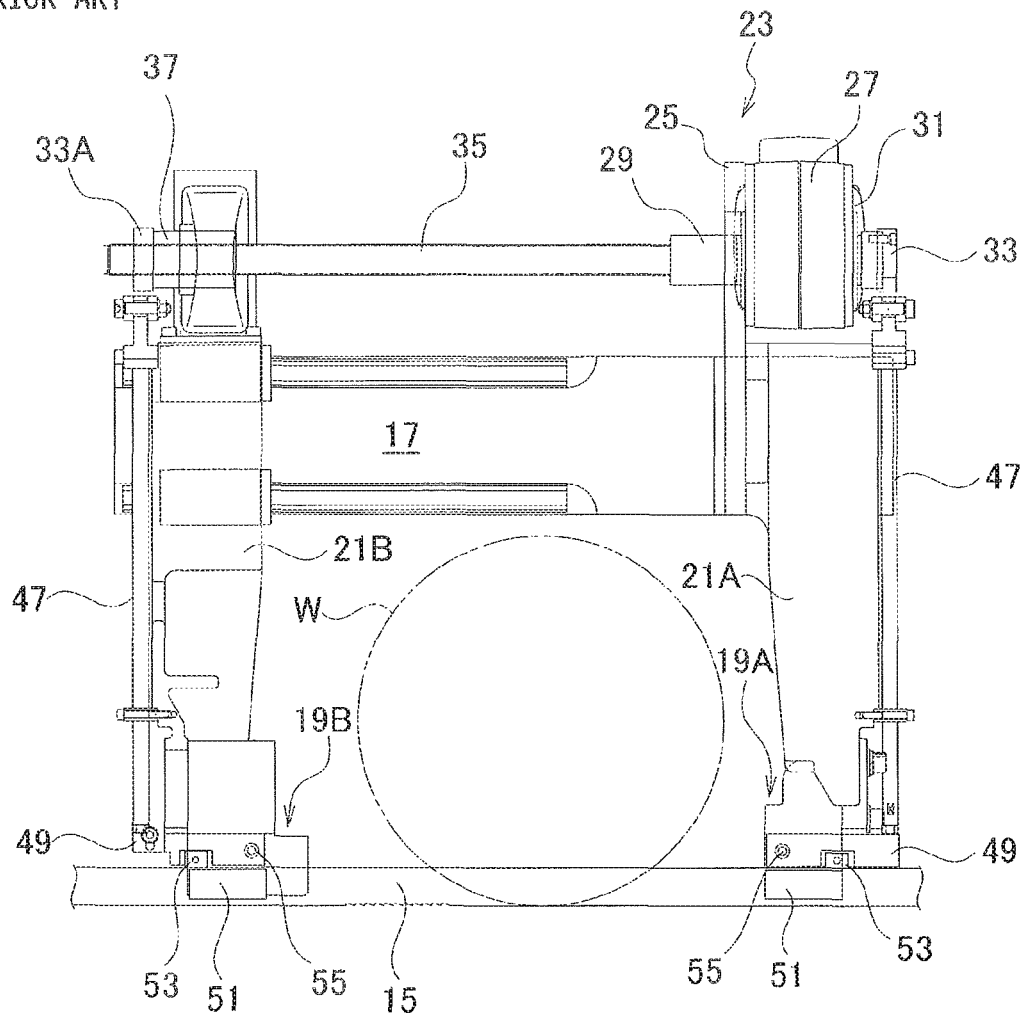
FIG. 2A is an elevational view of a device for guiding a saw band, which includes a vibrating device involved in the prior art.
Figure 2B:
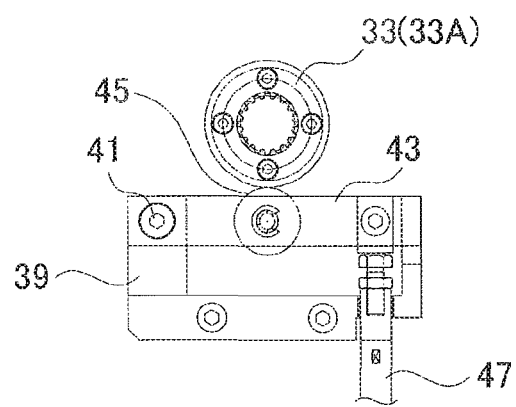
FIG. 2B is an enlarged side view of the vibrating device, which mainly shows a cam and its accompanying elements in the device for vibrating.
Figure 3:
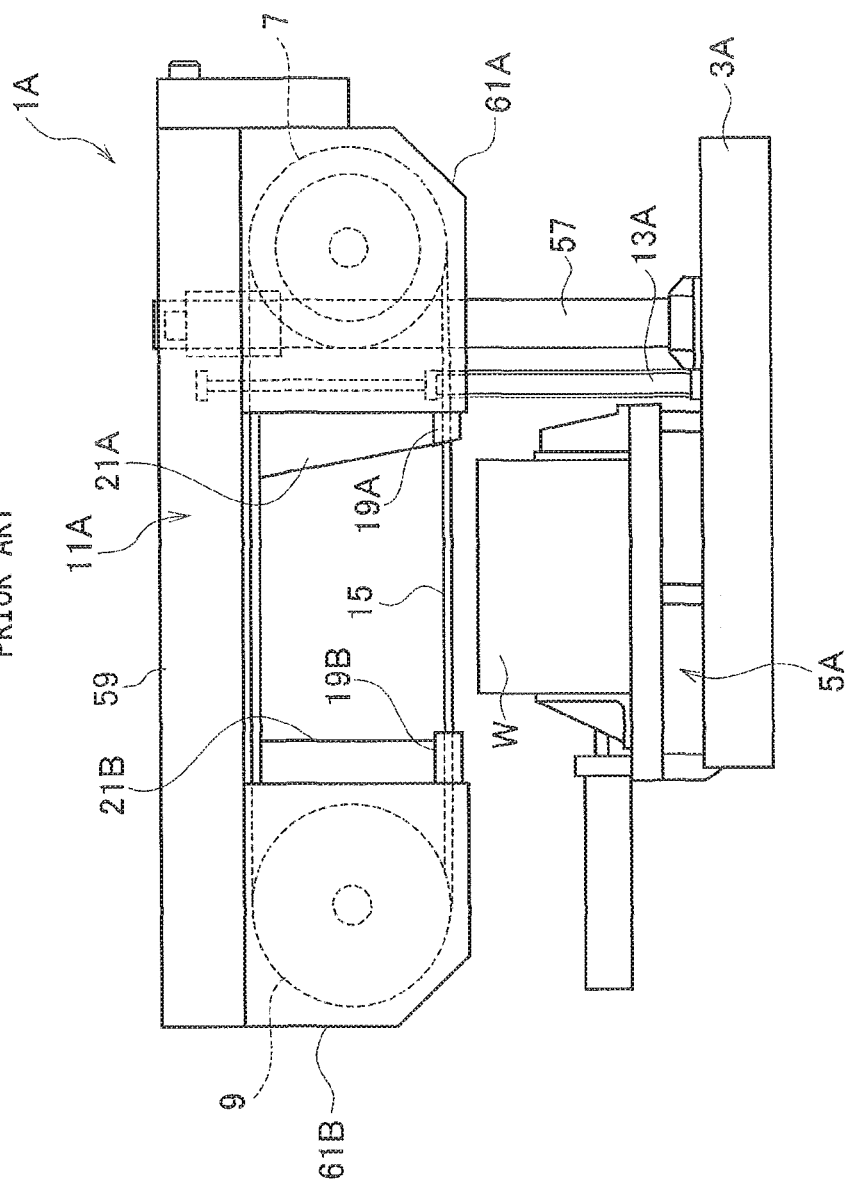
FIG. 3 is an elevational view of a horizontal band saw according to another example involved in the prior art.

Referring to FIG. 4, the total construction of the horizontal band saw according to the embodiment of the present invention is similar to the construction of the horizontal band saw 1A shown in FIG. 3. Therefore the description will be given hereinafter only about the construction of a saw housing that exhibits a distinctive construction.

The saw housing 63 in the horizontal band saw according to the embodiment of the present invention is, as with the saw housing 11A as described above, comprised of a beam member 59 elongated in a parting direction between the driving wheel 7 and the driven wheel 9 (the lateral direction in a horizontal band saw; the vertical direction in a vertical band saw), and one of wheel supporting members 65A is unitarily fixed with a rear surface at one end side of the beam member 59. Further, the driving wheel 7 and the driven wheel 9 are rotatably supported by the wheel supporting members 65A,65B.

The wheel supporting member 65A rotatably supporting the driving wheel 7 is provided to be substantially vertical and this wheel supporting member 65A is provided with one of saw band guiding devices 19A for directing and guiding cutting edges of the saw band 15 toward the workpiece W. And, another of the saw band guiding devices 19B, which along with said one of the saw band guiding devices 19A forms a pair, is provided to be movable in directions where it gets closer to and away from said one of the saw band guiding device 19A.

Figure 5:
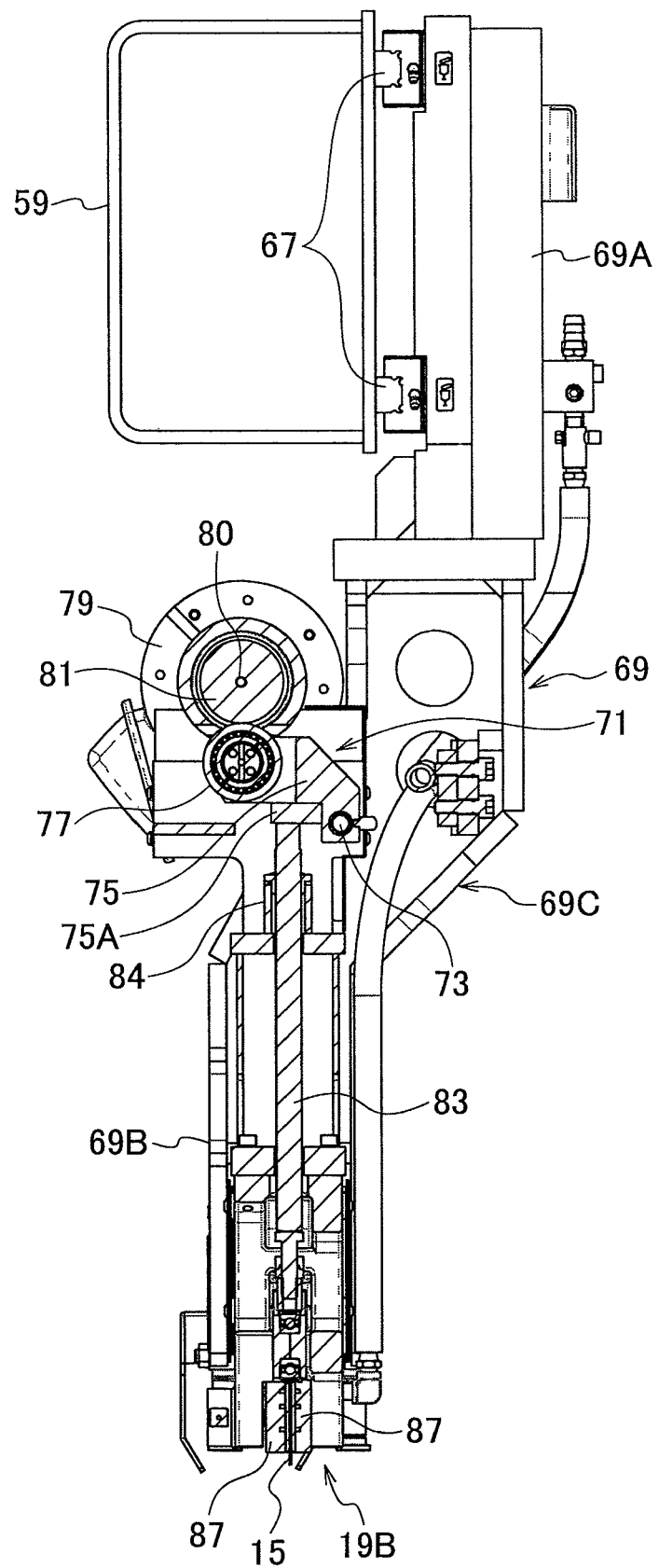
FIG. 5 is a partial side sectional view of the horizontal band saw according to the embodiment of the present invention, which mainly shows the guiding device supported by a beam, a reciprocating motion generation device and a pressure portion.

In more detail, the guide rails 67 (see FIG. 5) as a guide portion in the lateral direction are provided at a rear surface and at a central portion of a rear surface of the beam member 59. These guide rails 67 are provided with a guide arm member 69 to be movable. Further, at a tip end portion (lower end portion) of the guide arm member 69 provided is the saw band guiding device 19B. More specifically, the guide arm member 69 is comprised of a cut-direction rear portion side portion (upper side portion) 69A guided by the guide rails 67 and a cut-direction front portion side portion (lower side portion) 69B. And, at a curved portion where the upper side portion 69A is connected with the lower side portion 69B provided is a vibrating means 71 for vibrating the saw band guiding device 19B in a cutting direction of the saw band 15.

In more detail, at the curved portion 69C, a rocking lever 95, a proximal end portion side of which is pivoted on the guide arm 69 to be capable of rocking via a hinge pin 73, is provided, and a cam follower 77 is rotatably provided at a tip end portion side of the rocking lever 75. Further, a rotating actuator 79 such as a motor or such is attached to the curved portion 69C. A rotary shaft 80 of the rotating actuator 79 is provided to be substantially parallel with a direction where the saw band 15 runs, and a cam member 91 such as an eccentric cam for rocking the rocking lever 75 in the cutting direction of the saw band 15 via the cam follower 77 is unitarily provided at this rotary shaft 80.

Figure 6:
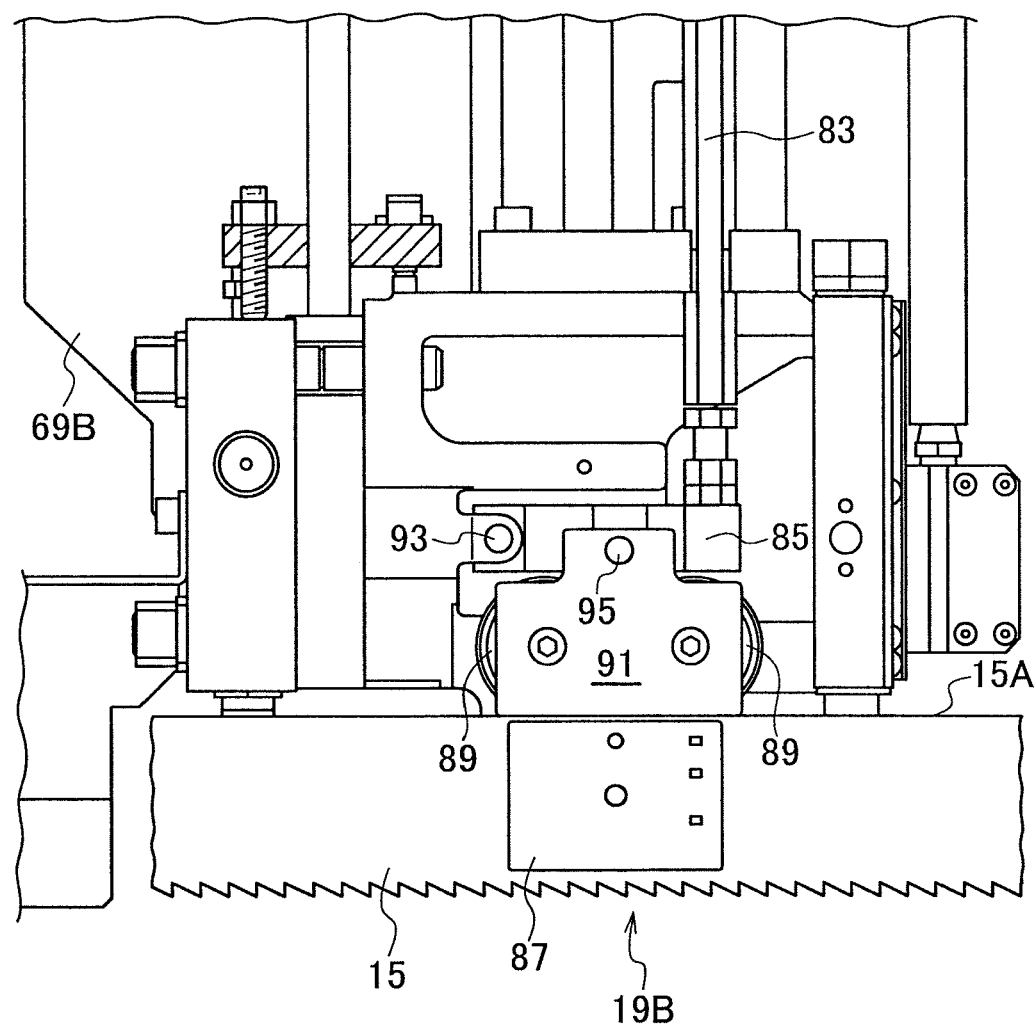
FIG. 6 is a partial elevational view of the horizontal band saw according to the embodiment of the present invention, which mainly shows the saw band and the pressure portion in contact therewith.

Further, one end portion (upper end portion) of a pressure rod 83 provided to be capable of reciprocating motion at the lower side portion 69B of the guide arm member 69 is in contact with a pressure portion 75A provided at the rocking lever 75. This pressure rod 83 is steadily urged by an urging means (repulsive member) 84 such as a coil spring or such provided at the lower side portion 69B in a direction where the rod 83 is to be in contact with the pressure portion 75A. Another end portion (lower portion) of the pressure rod 83 is in contact with a tip end portion of a rocking arm 85 (see FIG. 6) provided to be capable of rocking at the saw band guiding device 19B.

In more detail, the saw band guiding device 19B is, as with the prior saw band guiding devices, comprised of a pair of pinching guide members 87 pinching the saw band 15 from both sides. Further, the saw band guiding device 19B is comprised of a pressure member holder 91 comprising a plurality of pressure rollers 89 of a disk-like shape, which press a back surface 15A of the saw band 15, or a pressure member (not shown) in plane contact with the back surface 15A of the saw band 15. And, at the saw band guiding device 19B, a proximal end portion side of the rocking arm 85 is pivoted on a substantially central portion of this rocking arm 85 via a hinge pin 95 to be capable of rocking.

Said one of the saw band guiding device 19A is provided at a tip end side of a guide arm member unit 97 (see FIG. 4) unitarily provided to project from a front surface of the wheel supporting member 65A. Meanwhile, as the construction of the saw band guiding device 19A is similar to the construction of the saw band guiding device 19B, the same reference signs will be attached and thus redundant descriptions will be omitted.

As being already understood, when the rotating actuator 79 of each vibrating means 71 is made to rotate so that the cam member 81 rotates, the pressure rod 83 is put in reciprocating motion via the cam follower 77 and the rocking lever 75. And, when the tip end portion side of the rocking arm 85 is pressed by the pressure rod 83 in a direction where it gets closer to the saw band 15, the pressure member holder 91 is moved via the hinge pin 95 in the same direction and the plurality of pressure rollers 89 or the pressure member provided at the pressure member holder 91 press the back surface 15A of the saw band 15.

Even if the saw band 15, in this case, becomes bowed by cutting resistance in the cutting direction relative to the workpiece W, as the pressure member holder 91 is capable of rocking in response to this bowed state, the plurality of pressure rollers (pressure member) 89 evenly presses the back surface 15 of the saw band 15. In other words, the load on the workpiece by the saw band 15 in the cutting direction is dispersed evenly to the respective pressure rollers (pressure member) 89, thereby reducing load and extending the lifetime of the respective pressure rollers (pressure member) 89.

Further, as being understood from the aforementioned construction, as each vibrating means 71 is in the region below the beam member 59 and is provided within the region at the front side of the wheel supporting members 65A,65B, it can be enabled to improve compactness of the saw housing 63 and as well, when the saw band 15 is to be detached and exchanged from the driving wheel 7 and the driven wheel 9, it does not interfere with the saw band 15 so that the exchange of the saw band 15 is readily carried out.

Further, as the rotating actuator 79 of the vibrating means 71 is provided at the curved portion 69C and the rotary shaft 80 of the rotating actuator 79 is provided to be parallel with the direction where the saw band 15 runs, it is avoided that the rotating actuator 79 projects forward to a considerable extent, thereby improving compactness of the total constitution and safety.

Although the invention has been described above by reference to certain embodiments of the invention, the invention is not limited to the embodiments described above. Modifications and variations of the embodiments described above will occur to those skilled in the art, in light of the above teachings.

INDUSTRIAL APPLICABILITY

A band saw that extends the lifetime of pressure rollers is provided.

The invention claimed is:
1. A band saw comprising:
a driving wheel and a driven wheel rotatably provided at a saw housing;
an endless saw band that runs around the driving wheel and the driven wheel; and
a plurality of saw band guiding devices for directing and guiding cutting edges of the saw band toward a direction of a workpiece to be cut,
wherein the saw band guiding devices are movable in directions such that one of the guiding devices moves toward and away from another of the guiding devices,
wherein each of the saw band guiding devices comprises a vibrator including a rotating actuator, a cam coupled with and rotated by the rotating actuator, a cam follower in contact with the cam to undergo motion, and a pressure rod coupled with the cam follower and that vibrates the saw band in a cutting direction relative to the workpiece,
wherein a pressure member holder comprising a plurality of pressure rollers that press a back surface of the saw band, is provided in each of the saw band guiding devices and is pivoted about a position between two of the plurality of pressure rollers,
wherein the pressure member holder is provided to be rockably pivoted on a substantially central portion of a rocking arm coupled with and driven by the pressure rod so as to be capable of rocking in directions towards and away from the back surface of the saw band at each of the saw band guiding devices, and
wherein the plurality of rollers are in a free floating state in accordance with an edge of the saw blade.
2. The band saw as recited in claim 1,
wherein the saw housing comprises a beam member elongated in a parting direction between the driving wheel and the driven wheel, the saw housing further comprises the driving wheel and the driven wheel independently and rotatably mounted on front surfaces of wheel supporting members provided respectively at one end side and another end side of a rear surface of the beam member, wherein said one of the guiding devices is provided at a tip end side of a guide arm member that projects at a front surface of one of the wheel supporting members that rotatably comprises the driving wheel, and the rotating actuator of the vibrator that vibrates said one of the saw band guiding devices in the cutting direction of the saw band is provided at a proximal end side of the guide arm member, and wherein said another of the saw band guiding devices is provided at a tip end portion of a movable guide arm movable along a guide portion provided at the rear surface of the beam member and the rotating actuator of the vibrator that vibrates said another of the saw band guiding devices in the cutting direction of the saw band is provided at a curved portion in a front-and-rear direction of the guide arm member.

3. The band saw as recited in claim 2, wherein a rotary shaft of the rotating actuator is provided substantially in parallel with a direction in which the saw band runs.

* * * * *